US010552521B2

(12) United States Patent
Chi et al.

(10) Patent No.: US 10,552,521 B2
(45) Date of Patent: *Feb. 4, 2020

(54) ANALYZING A CLICK PATH IN A SPHERICAL LANDSCAPE VIEWPORT

(71) Applicant: INTERNATIONAL BUSINESS MACHINES CORPORATION, Armonk, NY (US)

(72) Inventors: Jian Wen Chi, Shanghai (CN); Wei Huang, Shanghai (CN); Yang Liu, Shanghai (CN); Xiang Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/114,320

(22) Filed: Aug. 28, 2018

(65) Prior Publication Data
US 2018/0365202 A1 Dec. 20, 2018

Related U.S. Application Data

(63) Continuation of application No. 14/703,972, filed on May 5, 2015, now Pat. No. 10,210,143.

(51) Int. Cl.
G06F 16/00 (2019.01)
G06F 17/22 (2006.01)
(Continued)

(52) U.S. Cl.
CPC ........ *G06F 17/2247* (2013.01); *G06F 16/248* (2019.01); *G06F 16/24578* (2019.01); *G06T 19/20* (2013.01); *G06T 2219/2016* (2013.01)

(58) Field of Classification Search
CPC ... H04L 67/22; G06F 17/2247; G06F 16/248; G06F 16/24578; G06F 2219/2016; G06T 19/20; G06T 2219/2016; G06T 10/20
See application file for complete search history.

(56) References Cited

U.S. PATENT DOCUMENTS 6,982,708 B1 1/2006 Mah et al.
7,471,827 B2 12/2008 Xie et al.
(Continued)

FOREIGN PATENT DOCUMENTS

DE 10157869 A1 6/2003

OTHER PUBLICATIONS

Chistopher Neasbitt, Roberto Perdisci, Kang Li , and Terry Nelms, "ClickMiner: Towards Forensic Reconstruction of User-Browser Interactions from Network Traces", CCS'14 Proceedings of the 2014 ACM SIGSAC Conference on computer and Communications Security, pp. 1244-1255, Nov. 3-7, 2014. (Year: 2014).*
(Continued)

*Primary Examiner* — Cheryl Lewis
(74) *Attorney, Agent, or Firm* — Michael O'Keefe

(57) ABSTRACT

Generating reports. Identifying user webpage interaction information and source webpage content. Determining a portion of the source code that corresponds to the user webpage interaction information. Determining interactions of the one or more interactions associated with each of a plurality of users. Determining a click path associated with each user. Determining a similarity score between a first and a second source webpage. Determining the similarity score exceeds a threshold value. Combining a portion of each click path associated with the first source webpage with a portion of each click path associated with the second source webpage. Merging a first portion of source code associated with the first source webpage with a second portion of source code associated with the second source webpage. Creating a three-dimensional representation that includes the combined portion of each click path associated with the first and the second webpage and the merged source code.

20 Claims, 9 Drawing Sheets

(51) Int. Cl.
*G06T 19/20* (2011.01)
*G06F 16/248* (2019.01)
*G06F 16/2457* (2019.01)

(56) References Cited

U.S. PATENT DOCUMENTS

| | | | |
|---|---|---|---|
| 7,587,486 B2 | 9/2009 | Taniguchi | |
| 7,644,375 B1 | 1/2010 | Anderson et al. | |
| 8,666,980 B1 | 3/2014 | Vora | |
| 8,682,741 B2 | 3/2014 | Minnis | |
| 9,426,139 B1 | 8/2016 | McClintock et al. | |
| 10,210,143 B2* | 2/2019 | Chi | G06F 16/248 |
| 2010/0070856 A1 | 3/2010 | Behl et al. | |
| 2010/0251128 A1 | 9/2010 | Cordasco | |
| 2011/0282860 A1 | 11/2011 | Baarman | |
| 2013/0097020 A1 | 4/2013 | McCullough | |
| 2014/0019492 A1 | 1/2014 | Woods et al. | |
| 2014/0172552 A1 | 6/2014 | Raab | |
| 2015/0088911 A1 | 3/2015 | Qiao et al. | |
| 2016/0328369 A1 | 11/2016 | Chi et al. | |

OTHER PUBLICATIONS

IBM: List of IBM Patents or Patent Applications Treated as Related (Appendix P), Oct. 29, 2018, pp. 1-2.

Cutroni, "Path Analysis in Google Analytics with Flow Visualization," http://cutroni.com/blog/2011/10/19/path-analysis-in-google-analytics-with-flow-visualization/, Oct. 19, 2011, 21 pages.

Cugini et al., "VISVIP: 30 Visualization of Paths through Web Sites", Database and Expert Systems Applications, 1999, Proceedings, Tenth International Workshop, IEEE Xplore, pp. 1-5.

Keller et al., "Virtualizing the Data Plane Through Source Code Merging", PREST0'08, Aug. 22, 2008, Copyright 2008 ACM, pp. 9-14.

* cited by examiner

ANALYZING A CLICK PATH IN A SPHERICAL LANDSCAPE VIEWPORT

FIELD OF INVENTION

The present invention relates generally to the field of computing, and more particularly to click path visualization.

BACKGROUND

Web analytics is the measurement, collection, analysis, and reporting of web data for purposes of understanding and optimizing web usage. Web analytics has been playing an increasingly strategic role in improving the user experience of websites for both business and market research as well as assessing the effectiveness of a website. An important area of web analytics is click analytics. Click analytics is a type of web analytics that focuses on the user click path through a website. The click path is the sequence of links that website visitors follow. A click path may begin on a primary website or a third party website, such as a search engine results page, and continue through a successive sequence of webpages visited by the user. Click paths may capture website call data and match the call data to ad sources, keywords, or referring domains.

SUMMARY

Embodiments of the present invention disclose a method, system, and program product for generating reports. A computer identifies user webpage interaction information associated with source code of one or more source webpages and source webpage content associated with the source code of the one or more source webpages, whereby the user webpage interaction information includes one or more interactions, and whereby the one or more interactions include at least one of one or more mouse movements, one or more keyboard interactions, and one or more element interactions for one or more users. The computer also determines at least a portion of the source code that corresponds to each interaction of the one or more interactions. The computer then determines a set of interactions of the one or more interactions associated with each of a plurality of users. The computer then determines a click path associated with each user of the plurality of users based on the determined set of interactions of the one or more interactions associated with each user. The computer then determines a similarity score between at least a first and a second source webpage of the one or more source webpages by comparing source code associated with each of the first and the second source webpage. The computer then determines the similarity score between at least the first and the second source webpage exceeds a threshold value. The computer then combines a portion of each click path associated with the first source webpage with a portion of each click path associated with the second source webpage. The computer then merges a first portion of source code associated with the first source webpage with a second portion of source code associated with the second source webpage, whereby the first portion of source code and the second portion of source code are substantially similar. Finally, the computer creates a three-dimensional representation, whereby the three-dimensional representation includes the combined portion of each click path associated with the first and the second webpage and the merged source code.

DETAILED DESCRIPTION

Figure 1:
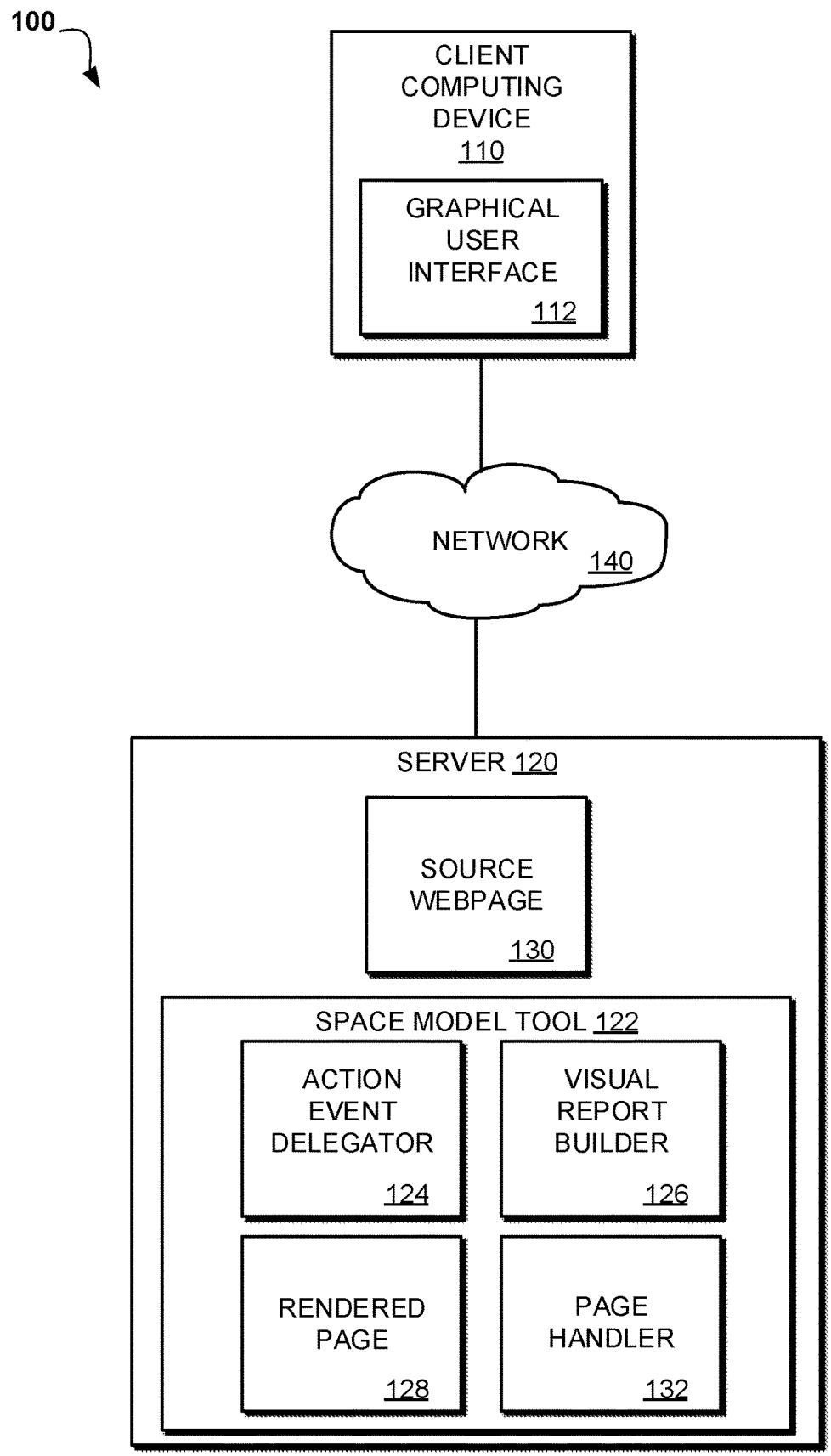
FIG. 1 is an illustration of an exemplary architecture for a click path visualization system, in accordance with one embodiment of the present invention.

Embodiments of the present invention are directed to analyzing user click paths as a three-dimensional space model in a landscape viewport.

Click analytics may record user click paths through websites to better understand user tendencies and improve the user experience. Typically, click paths may be visualized using a two dimensional model of the click path through hyperlinks. With the pervasiveness of Web 2.0 and rich internet applications, such as Java and Adobe Flash, users may be able to complete most webpage interactions without many page switches. Since webpages instituting these new technologies may only require user navigation between elements on a single page rather than navigating hyperlinks to different webpages, gathering user click path data may be difficult.

Several issues may arise when displaying the user click path as a two-dimensional model. For example, a two-dimensional model may not generate a clear click path report for the behavior of different users based on numerous elements within the webpage. Since the two-dimensional model may draw the click path from element to element directly, the click path may cross over many times leaving the click path report confusing to understand. As an additional example, the click path report for hidden or temporarily created content, such as TabContainer or dialog boxes, may not be generated in a one-page click path report when using the two-dimensional model. At any one time, only part of the click path may be seen, which may not give the user a clear landscape of the entire click path. Also, generating meaningful and readable click path reports for different pages with similar structures, such as product detail pages for different commodities using the same structure for each commodity, may be difficult using the two-dimensional model since a different click path report may be needed for each special page, which may result in excessive page duplication. As such, it may be advantageous, among other things, to implement a three-dimensional space model that calculates and visualizes click paths within or across webpages.

According to one embodiment, a click path may be visualized in as a three-dimensional space model in a landscape perspective viewport. The three-dimensional space model, or space model, may significantly eliminate click path overlap for large amounts of aggregated data. Implementation of the space model may also generate click path reports with more meaningful data analysis results than may be created by two-dimensional models.

The present embodiment may utilize customizable machinery to transform a webpage into a three-dimensional space model, such as a cube, a sphere, a pyramid, a cylinder, a cuboid, a prism, a code and a frustum. This model may allow the aggregated click path to be clearly visualized and easily observed from various dimensions with the ability to scale the model in and out. Additionally, using a three-dimensional space model for displaying a click path report containing hidden or dynamically generated page content may allow such content to be clearly placed and viewed within the space model. Furthermore, the three-dimensional space model may allow pages with similar structures to be aggregated to generate a more meaningful click path report in one landscape page. Therefore, embodiments of the present invention may have the capacity to improve the technical field of click path visualization by allowing for easy viewing and understanding of click path reports.

FIG. 1 is an illustration of an exemplary architecture for a click path visualization system, in accordance with one embodiment of the present invention. The click path visualization system 100 may include a server 120 and client computing device 110, all interconnected over a network 140. Generally, the networked computer environment 100 may include a plurality of client computing devices 110 and servers 120, in accordance with embodiments of the invention.

The communication network 140 may include various types of communication networks, such as a wide area network (WAN), local area network (LAN), a telecommunication network, a wireless network, a public switched network and/or a satellite network, and may include connections, such as wire, wireless communication links, or fiber optic cables. In general, communication network 140 can be any combination of connections and protocols that will support communications between client computing device 110 and server 120, in accordance with embodiments of the invention.

In various embodiments of the invention, a client computing device 110 may be, for example, a laptop computer, tablet computer, netbook computer, personal computer (PC), a desktop computer, a personal digital assistant (PDA), a smart phone, a thin client or any computing system capable of receiving and sending data to and from other computing devices, such as server 120, via network 140, running a program, and displaying a graphical user interface 112 to view a click path report.

Server computer 120 may be a laptop computer, netbook computer, personal computer (PC), a desktop computer, or any programmable electronic device capable of hosting a space model tool 122, described below, source webpage 130 and communicating with client device 110 via network 140, in accordance with embodiments of the invention. Server computer 120 may include internal and external hardware components, as depicted and described in further detail below with reference to FIG. 8. Although not shown, optionally, server 120 may comprise a cluster of web servers executing the same software to collectively process the requests for the webpages as distributed by a front end server and a load balancer. Server 120 may also operate in a cloud computing service model, such as Software as a Service (SaaS), Platform as a Service (PaaS), or Infrastructure as a Service (IaaS). Server 120 may also be located in a cloud computing deployment model, such as a private cloud, community cloud, public cloud, or hybrid cloud.

In accordance with one embodiment, source webpage 130 is a two-dimensional webpage visited by a user. Once the user interacts with source webpage 130 through webpage navigation using graphical user interface 112, source webpage 130 may be saved by space model tool 122. Source webpage 130 may include the source code used to generate a two-dimensional representation of source webpage 130 on graphical user interface 112.

Space model tool 122 may be software capable of generating a three-dimensional space model for presenting a click path report using user behavioral data, or user action data. Space model tool 122 may contain action event delegator 124, visual report builder 126, and rendered webpage 128. Space model tool 122, using action event delegator 124 and visual report builder 126, may interpret raw user event data, source webpage content, and event trigger time data relating to user interactions on source webpage 130 to create a three-dimensional space model. Action event delegator 124 is described in more detail with reference to FIG. 2. Visual report builder 126 is described in more detail with reference to FIG. 3.

Rendered pages 128 are three-dimensional representations of the two-dimensional source webpages 130. Rendered pages 128 may be constructed using the source webpages 130 and implementing scalable vector graphic technology to transform the two-dimensional source webpages 130 into a three-dimensional space object representation of a geometric shape, such as a cube or a sphere, where the page elements of each source webpage lie on the surface of the three-dimensional space object.

Page handler 132 is be a component within space model tool 122 that compiles similarly structured pages. Source webpages 130 with similar page structures may be represented in a single three-dimensional space model to reduce the number of click path reports generated by space model tool 122. The similarity between source webpages 130 may be determined by utilizing a rank algorithm. The rank algorithm is described in more detail with reference to FIG. 4. In conjunction with click path aggregator 300, page handler 132 may combine source webpages 130 based on a threshold rank as determined by the rank algorithm. For example, if the rank algorithm determines two source webpages 130 are structurally 95% the same, then the page handler may combine elements of those pages into single source webpage 130.

Figures 2, 3:
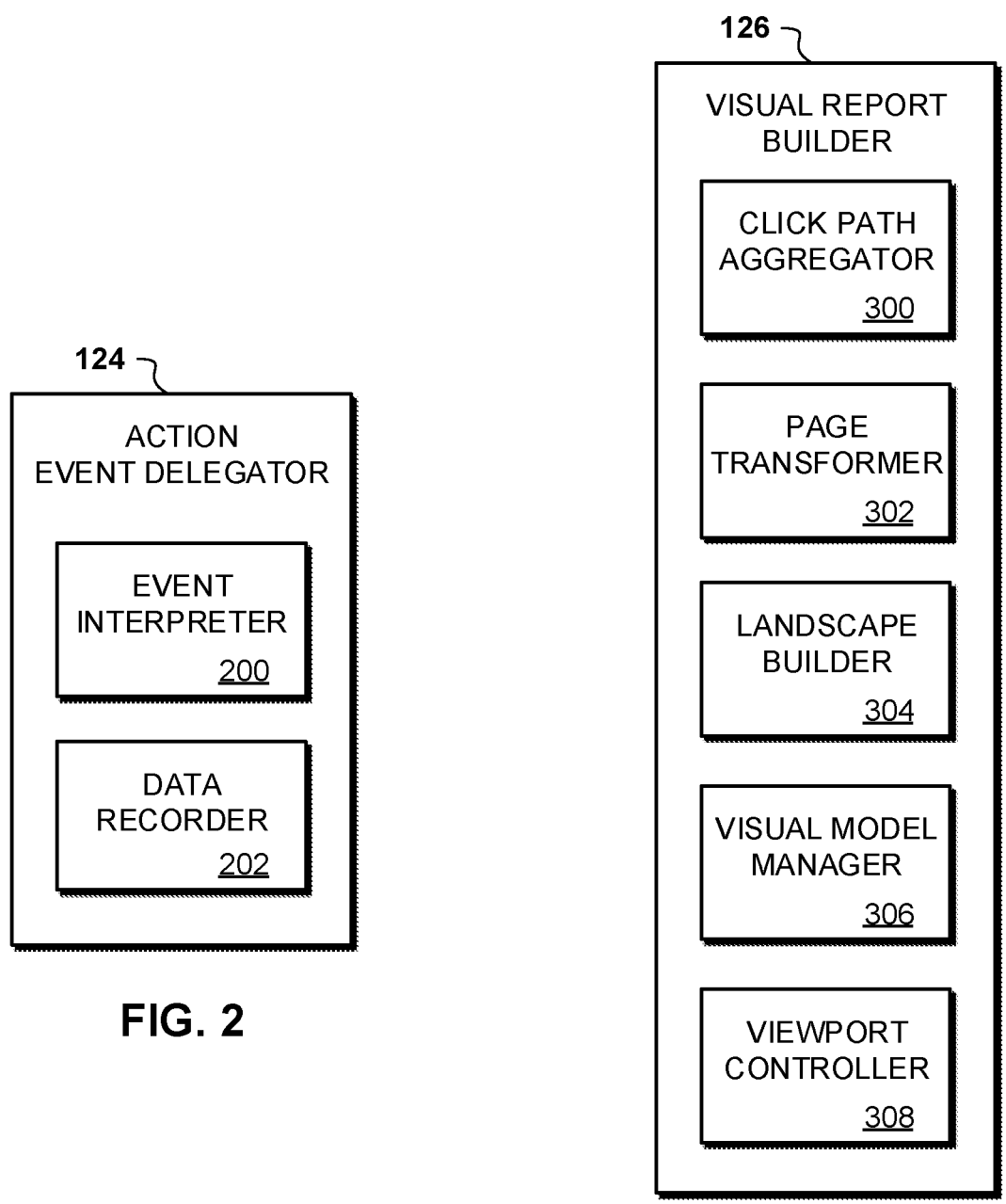
FIG. 2 is a functional block diagram of the action event delegator of FIG. 1, in accordance with one embodiment of the present invention.
FIG. 3 is a functional block diagram of the visual report builder of FIG. 1, in accordance with an embodiment of the present invention.

Referring now to FIG. 2, the action event delegator 124 may be used to interpret and record user behavioral data. The action event delegator 124 may include an event interpreter 200 and a data recorder 202. The event interpreter 200 may analyze raw user event data, webpage content data, and event trigger time data to generate user behavioral data for later analysis by space model tool 122.

The data recorder 202 may record the generated user behavioral data. The data recorder 202 may store the generated user behavioral data and the source webpages 130 on server 120.

Referring now to FIG. 3, the visual report builder 126 may be used to compile analyzed user behavioral data and rendered pages 128 to create an interactive three-dimensional space model of the user click path. The visual report builder 126 may include a click path aggregator 300, a page transformer 302, a landscape builder 304, a visual model manager 306, and a viewport controller 308. Each component may perform a role in constructing and controlling the viewport of the three-dimensional space landscape.

Click path aggregator 300 within visual report builder 126 may combine multiple generated user click paths together. Click path aggregator 300 may receive multiple analyzed click paths from space model tool 122 and, using a rank algorithm, click path aggregator 300 may determine the structural similarity between source webpages 130. Since several source webpages 130 may have a similar structure and, therefore, a common click path, the click path aggregator 300 may combine the click paths for similarly structured source webpages 130 so that they may be displayed within the same click path report.

Page transformer 302 may combine the rendered pages 128 with the corresponding click paths from the source webpages 130 to create a three-dimensional page. When the rendered pages 128 are created by the space model tool 122, each rendered page 128 may simply be a three-dimensional representation of the source page 130. Page transformer 302 may need to draw the click paths on the three-dimensional rendered pages 128. Page transformer 302 may have the ability to configure the click paths, which may be represented in two dimensions when received by the page transformer 302, into a three-dimensional click path report so that the click paths properly correlate to the three-dimensional rendered pages 128.

Landscape builder 304 may be used to build the three-dimensional space model based on hidden or temporarily created content, newly created page content, and cross page solutions within the source webpages 130 and the rendered pages 128. Hidden or temporarily created content may include viewable portions of a source webpage 130 that may only appear when a user clicks on a tab. When a tab is not actively selected by a user, the portion of the source webpage 130 may be hidden from the user. Newly created page content may include content entered by a user directly within source webpage 130 in a dialog box or a radio box. Cross page solutions from similarly structured webpages may include content compiled from multiple source webpages 130 so similar in structure that the content may represented in the same three-dimensional space model, such as product pages on a retail website.

Visual model manager 306 may be implemented to allow a user to interact with the space model. In order to allow the click path report to be viewed clearly and conveniently, visual model manager 306 may allow a user alter aspects of the three-dimensional space model, such as scale, skew, change viewport, and change perspective.

Viewport controller 308 may be a user tool that allows the three-dimensional space model to be manipulated by a user so the various perspectives of the three-dimensional space model may be viewed. Viewport controller 308 may allow the user to use a mouse to click-and-drag to rotate the space model thereby allowing the user to view the space model from different perspectives.

Figure 4:
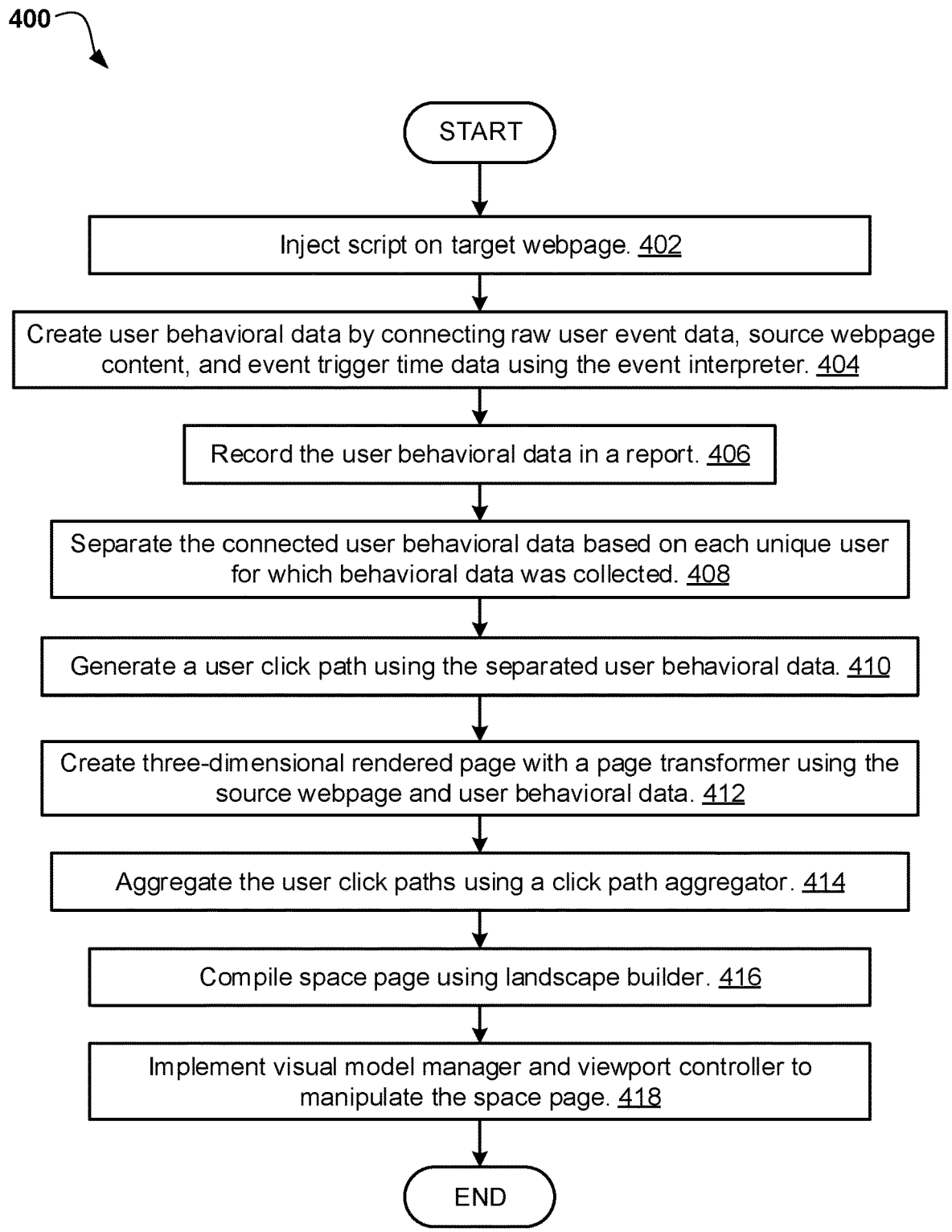
FIG. 4 is a flowchart depicting the operational steps of the click path visualization system of FIG. 1, in accordance with one embodiment of the present invention.

Referring now to FIG. 4, a flowchart illustrating the operational steps of the click path visualization system of FIG. 1 is depicted, in accordance with one embodiment of the present invention. In the example embodiment, space model tool 122 creates the three-dimensional model by injecting a script into a source webpage 130 that may allow the space model tool 122 to collect user webpage event information, or user webpage interaction information, such as raw user event data, source webpage content, and event trigger time data, relating to user interactions on source webpages 130 (step 402). The user webpage event information may include user mouse movements, user keyboard behavior, element interactions, and click data on source webpages 130. Event trigger time data may relate to the time, sequence, and duration of each item of raw user event data. When received by the space model tool 122, the raw user event data, source webpage content, and event trigger time data may simply be a series, or set, of user movements and interactions that are not visually associated with the source webpage 130. For example, the raw user event data, source webpage content, and event trigger time data may contain a series of coordinates that represent the position of the mouse over a period of time. The series of coordinates may not yet be associated any particular source webpage 130.

Space model tool 122 then implements action event delegator 124 to map the user webpage information and source webpage content to create user webpage behavioral data (step 404). The action event delegator 124 may utilize event interpreter 200 to combine the raw user event data, source webpage content, and event trigger time data. Since the raw user event data, source webpage content, and event trigger time data may not be visually associated with the source webpage 130, event interpreter 200 may analyze and combine these items of data to create user behavioral data. For example, raw user event data may illustrate user mouse movement over a webpage and source webpage content may contain the elements of source webpage 130. Before being analyzed and combined by event interpreter 200, this data may not be separate and not relatable. By utilizing event interpreter 200, the user movements and interactions on source webpage 130 may be better understood since they may now be connected and relatable to each other. The user behavioral data, as a whole, may be more accurate than the individual items of raw user event data, source webpage content, and event trigger time data when understanding user behavior on a source webpage 130.

Once event interpreter 200 within action event delegator 124 has created the user behavioral data, data recorder 202, which may also be located within action event delegator 124, records the created user behavioral data (step 406). The user behavioral data may be recorded by data recorder 202 so that space model tool 122 may further analyze the user behavioral data and incorporate that data into a three-dimensional space model. Data recorder 202 may save the user behavioral data on server 120.

Once action event delegator 124 has created the user behavioral data with the source webpage 130 and recorded the user behavioral data, space model tool 122 performs an action data analysis of the user behavioral data and source webpage 130 (step 408). In order to generate a click path report, space model tool 122 may analyze the connected user behavioral data to determine whether particular click paths within the user behavioral data belongs to the same unique user. For example, user behavioral data collected by space model tool 122 may include data recorded from three unique users. In order to determine the click path of each unique user, space model tool 122 may perform action data analysis to separate the unique user click paths. Action data analysis is the process of analyzing the recorded user behavioral data in order to separate the user behavioral data by each unique user. Separating the user behavioral data by each unique user may allow space model tool 122 to generate a report, which may represent a unique user navigational path across source webpage 130. The user behavioral data may be separated using data specific to each unique user, such as internet protocol address.

Once the behavioral data is separated for each unique user, space model tool 122 generates a user click path report for each unique user (step 410). Since the separated user behavioral data may represent navigational steps for each unique user on source webpage 130, the user click path may be created using the separated user behavioral data. The user click path may be a series of lines or arrows within a box representing the outline of the source webpage 130. For example, a user may begin interacting with a source webpage 130 by clicking a mouse at Point A and then navigating from Point A to Point B. At Point B, the user may click on a dialog box and enter information using a keyboard. Upon completing interactions within the dialog box, the user may navigate from Point B to Point C and click the mouse at Point C. These interactions may be represented in a box with equal dimensions to source webpage 130. Point A, Point B, and Point C may be represented as dots within the box, since the user clicked the mouse at each point. Arrows may be drawn from the coordinates of Point A to the coordinates of Point B and the coordinates of Point B to the coordinates of Point C. The user keyboard interactions with the dialog box may be displayed in a popup window when the dot representing Point B on the click path is selected.

Once the user click path is generated, page transformer 302 within visual report builder 126 then creates rendered page 128 by transforming two-dimensional source webpage 130 and the two-dimensional user click path into a three-dimensional representation (step 412). Typically, the generated user click path may be displayed on top of the source webpage 128, since the generated user click path visually represents user navigation across source webpage 130. Since user understanding of the click path report may be difficult on two-dimensional source webpage 130 due to significant crossover of the user click path, space model tool 122 may create three-dimensional rendered page 128 on which to display the click path report. When developed, each source webpage 130 may only be designed for two-dimensional display, since hypertext markup language (HTML) may be formatted to only allow page height and page width. In order to portray rendered page 128 as a three-dimensional space model, depth may be added to source webpage 130. Depth may be added by wrapping two-dimensional source webpage 130 around a three-dimensional geometric shape, such as a sphere or a cube. Therefore, rendered page 128 may be created with the user click path traversing through the interior of the three-dimensional page. For example, if a sphere is used to model rendered page 128 and a user interacted with Point A, Point B, and Point C on the source page, Point A, Point B, and Point C may lie on the surface of the spherical rendered page 128. The click path may use vector lines to connect Point A to Point B and Point B to Point C through the interior of spherical rendered page 128. If the generated user click path included interactions on the source webpage, such as typing into a dialog box, such user interactions may be displayed within the actual elements on the surface of spherical rendered page 128. By superimposing the user click path on the source webpage 128, a reviewer may be able to visually analyze the click path to learn user navigation tendencies and understand the user navigation path in order to improve the user experience on the source webpage 128. Space model tool 122 may utilize scalable vector graphics to create rendered page 128 from source webpage 130 and the user click path. Rendered page 128 may appear as a three-dimensional representation of source webpage 130 stretched fit on the surface of the three-dimensional space model. Rendered page 128 may include the same page elements, such as hyperlinks and text, as represented on source webpage 130.

Multiple generated user click paths are combined together depending upon a similar page structure of the source webpage 130 from which each generated user click path originated using a click path aggregator 300 within visual report builder 126 (step 414). For example, if Source Webpage A and Source Webpage B are identical except for the color of each page, then the click path aggregator 300 may combine the click paths for these similar pages. Source webpages 130 utilizing many components within one page, such as web 2.0 webpages, may be very unique and the page structure may be vastly different from each source webpage 130. However, the click paths for similarly structured source webpages, such as JavaServer Pages, may be combined together in order to create a more accurate click path report. Using a rank algorithm, the click path aggregator 300 may determine the similarity between multiple source webpages 130. The rank algorithm may analyze the source code structure of source webpages 130 and assign a similarity rank. If the similarity rank for the source webpages 130 is above a threshold similarity value, such as 90%, then the click path aggregator 300 may combine the click paths so that each click path may be displayed within the same click path report.

Landscape builder 304 within visual report builder 126 then compiles the elements of the three-dimensional space model into a single model for display in a viewport (step 416). Once the click path aggregator 300 determines which click paths to combine based on the rank algorithm, the landscape builder 304 may combine the click paths and rendered page 128. When combining click paths and rendered page 128, landscape builder 304 may also include hidden portions of the source webpage 130, newly created content, and cross page solutions, such as portions of pages containing similar structures. As previously described, hidden or temporarily created content may include viewable portions of a source webpage 130 that may only appear when a user clicks on a tab. Since space model tool 122 understands the source code structure, areas of the source webpage containing hidden content and newly created content, such as page tabs and dialog boxes, respectively, may be monitored for user interactions. Since hidden content and newly created content may include large amounts of data that is not represented on source webpage 130 at a single time, landscape builder 304 may represented hidden content and newly created content on rendered page 128 as semispheres affixed to the surface of the three-dimensional space model.

Once compiled together by landscape builder 304, visual model manager 306 and viewport controller 308 are utilized to allow a user to interact with constructed three-dimensional space model. For example, if a user wishes to zoom in on a particular section of the three-dimensional space model, the user may click on a particular section of the three-dimensional space model and the visual model manager 306 may zoom in on a section of the three-dimensional space model. Similarly, if a user wishes to view a different side of the three-dimensional space model, the user may click and drag the mouse from left to right and viewport controller 308 may rotate the three-dimensional space model clockwise to give the user a different view of the three-dimensional space model.

Figure 5:
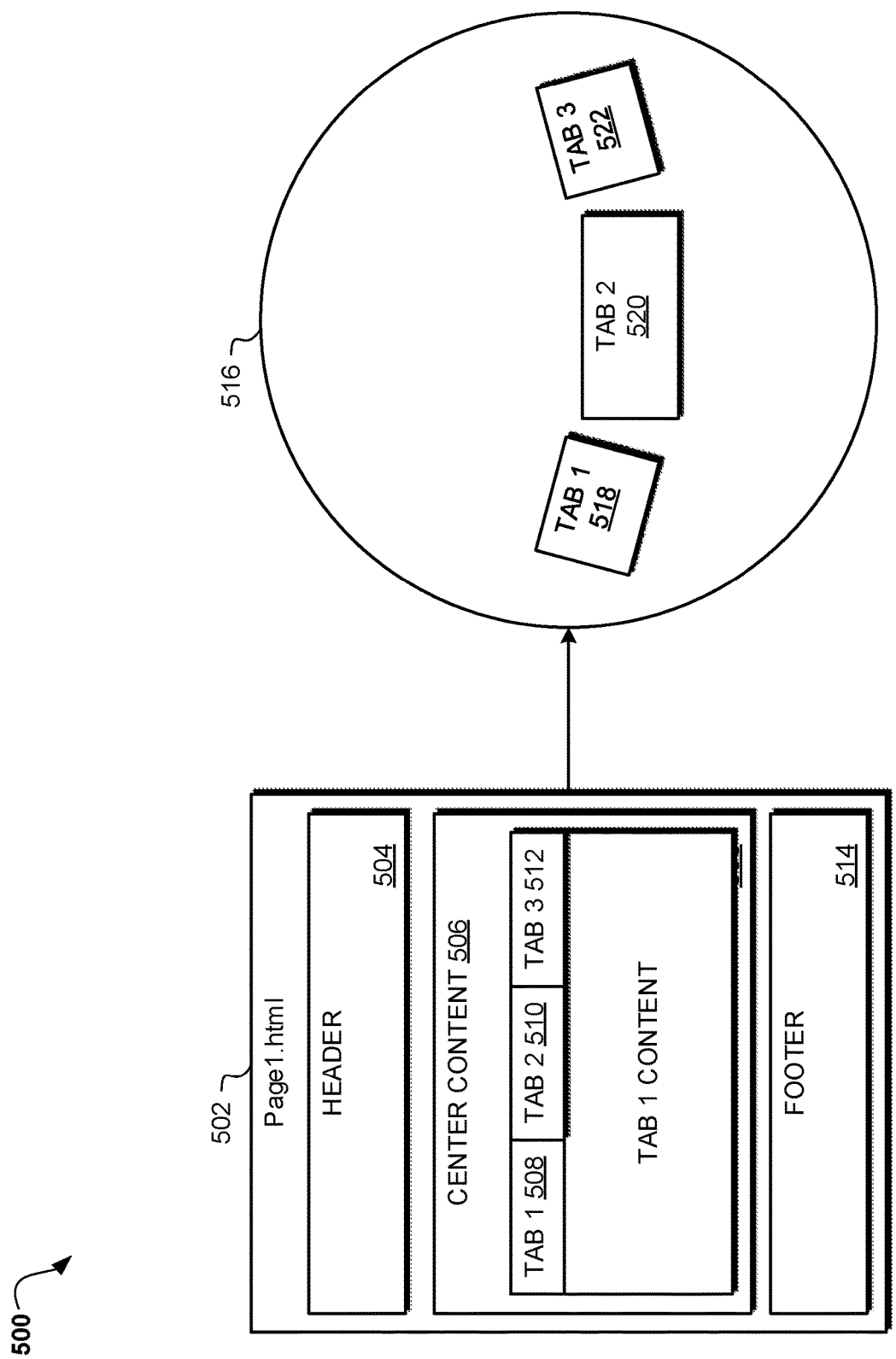
FIG. 5 illustrates a click path visualization using hidden information, in accordance with one embodiment of the presenting invention.

Referring now to FIG. 5, a block diagram 500 of hidden content represented on a two-dimensional source webpage and transferred to a three-dimensional space model is depicted, in accordance with one embodiment of the present invention. Source webpage 502 may represent a website that a user has navigated and from which user behavioral data may be analyzed. Source webpage 502 may include different sections, including header 504, center content 506, and footer 514. Center content 506 may include various tabs, such as tab 1 508, tab 2 510, and tab 3 512. Each tab within center content 506 may include content unique to each tab. Additionally, when one tab is selected by a user, the other tabs may be hidden from view. For example, when a user selects tab 1 508, the content of tab 1 508 may be visible to the user while the content of tab 2 510 and tab 3 512 may be hidden from the user.

When space model tool 122 generates three-dimensional space model 516 of the user click path, each tab of content 508-512 may be displayed on the space model without any tab hidden from view. For example, three-dimensional space model 516 may be the three-dimensional click path representation of source webpage 502. Three-dimensional space model 516 may include tab 1 518, tab 2 520 and tab 3 522 which may be space model representations of tab 1 508, tab 2 510, and tab 3 512, respectively. In one embodiment of the present invention, each tab 518-522 may lie of the surface of three-dimensional space model 516. In another embodiment of the present invention, each tab 518-522 may be an individual semi-sphere affixed to the surface of three-dimensional space model 516. Representing tabs 518-522 as semi-spheres affixed to three-dimensional space model 516 may allow more click path information to be represented on three-dimensional space model 516.

Figure 6:
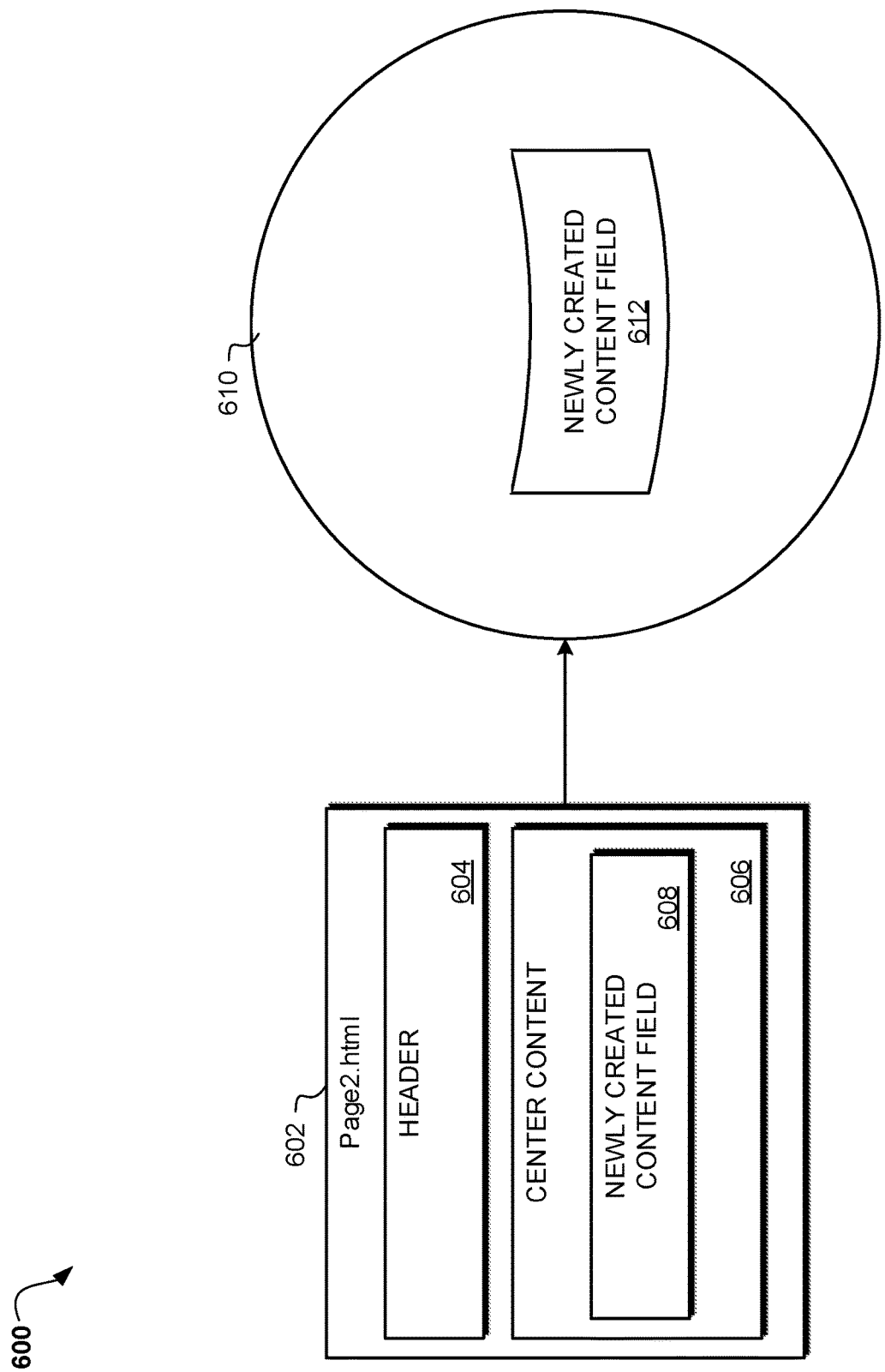
FIG. 6 illustrates a click path visualization using newly created content, in accordance with one embodiment of the presenting invention.

Referring now to FIG. 6, a block diagram 600 of newly created content represented on a two-dimensional source webpage and transferred to a three-dimensional space model is depicted, in accordance with one embodiment of the present invention. Source webpage 602 may represent a website that a user has navigated and from which user behavioral data may be analyzed. Source webpage 602 may include different sections header 604 and center content 606. Additionally, center content 606 may include newly created content field 608. Newly created content field 608 may be a field within center content 606 that allows a user of source webpage 602 to input data, such as a dialog box.

When space model tool 122 generates a three-dimensional space model 610 of the user click path, the information within newly created content field 608 may be displayed on the surface of the three-dimensional space model 610. For example, three-dimensional space model 610 may be the three-dimensional click path representation of source webpage 602. Three-dimensional space model 610 may include newly created content field 612 which may be a space model representation of two-dimensional newly created content field 608. In one embodiment of the present invention, each newly created content field 612 may lie of the surface of three-dimensional space model 610. In another embodiment of the present invention, newly created content field 612 may be a separate semi-sphere affixed to the surface of three-dimensional space model 610. Representing newly created content field 612 as a semi-sphere affixed to three-dimensional space model 610 may allow more click path information to be represented on three-dimensional space model 610.

Figure 7:
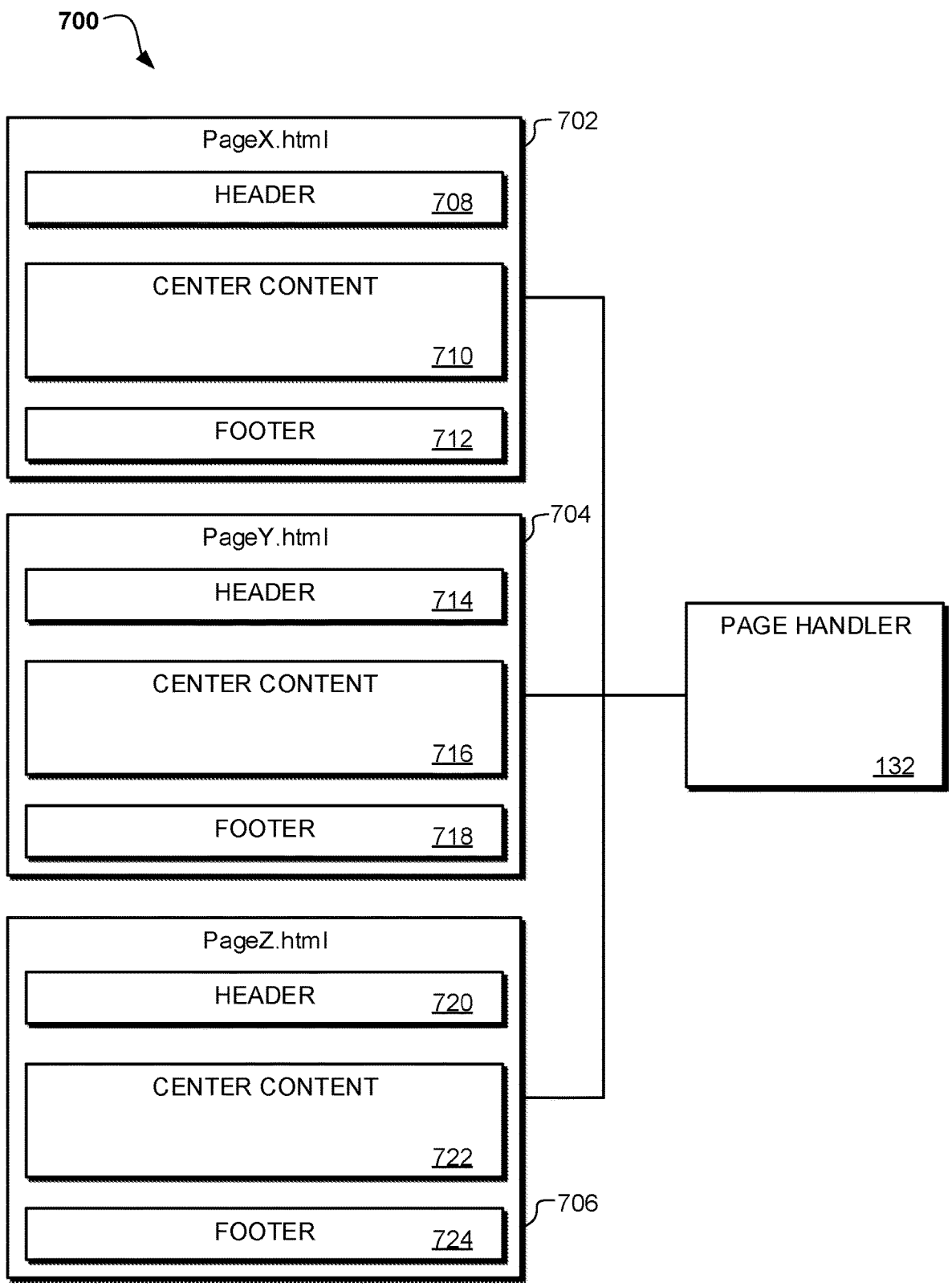
FIG. 7 illustrates combining different pages using a page handler to create a click path visualization, in accordance with one embodiment of the presenting invention.

Referring now to FIG. 7, a block diagram 700 of source webpages with similar page structure on two-dimensional source webpages and a page handler are depicted, in accordance with one embodiment of the present invention. Source webpages 702-706 may represent websites that a user has navigated and from which user behavioral data may be analyzed. Source webpage 702 may include header 708, center content 710, and footer 712. Source webpage 704 may include header 714, center content 716, and footer 718. Source webpage 706 may include header 720, center content 722, and footer 724.

Page handler 132 may be a tool used to analyze and combine similarly structured source webpages 130. For example, if page handler 132, using the rank algorithm, determines source webpages 702-706 are similarly structured, page handler 132 may combine source webpages 702-706. Similarly, page handler 132, using the rank algorithm, may determine that source webpages 702-706 as a whole do not meet the threshold rank in order to be combined by page handler 132. However, page handler 132 may determine that certain elements within source webpages 702-706, such as header 708, header 714, and header 724, may satisfy a threshold rank in order for those elements to be combine by page handler 132. Therefore, page handler 132 may combine header 708, header 714, and header 724.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:
(a) On-demand self-service: a cloud consumer can unilaterally provision computing capabilities, such as server time and network storage, as needed automatically without requiring human interaction with the service's provider.
(b) Broad network access: capabilities are available over a network and accessed through standard mechanisms that promote use by heterogeneous thin or thick client platforms (e.g., mobile phones, laptops, and PDAs).
(c) Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).
(d) Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.
(e) Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

(a) Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

(b) Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

(c) Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

(a) Private cloud: the cloud infrastructure is operated solely for an organization. It may be managed by the organization or a third party and may exist on-premises or off-premises.

(b) Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

(c) Public cloud: the cloud infrastructure is made available to the general public or a large industry group and is owned by an organization selling cloud services.

(d) Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
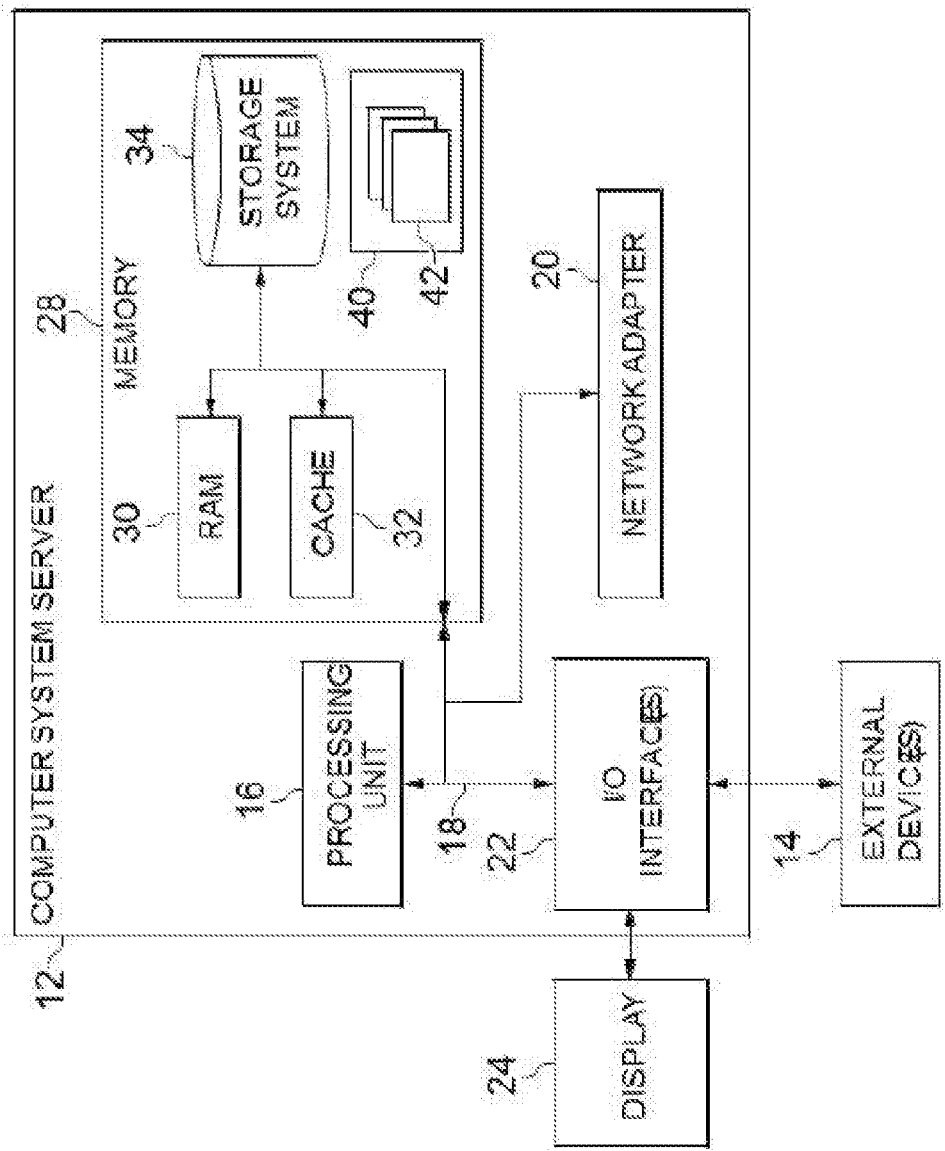
FIG. 8 depicts a cloud computing node according to an embodiment of the present invention.

Referring now to FIG. 8, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 9:
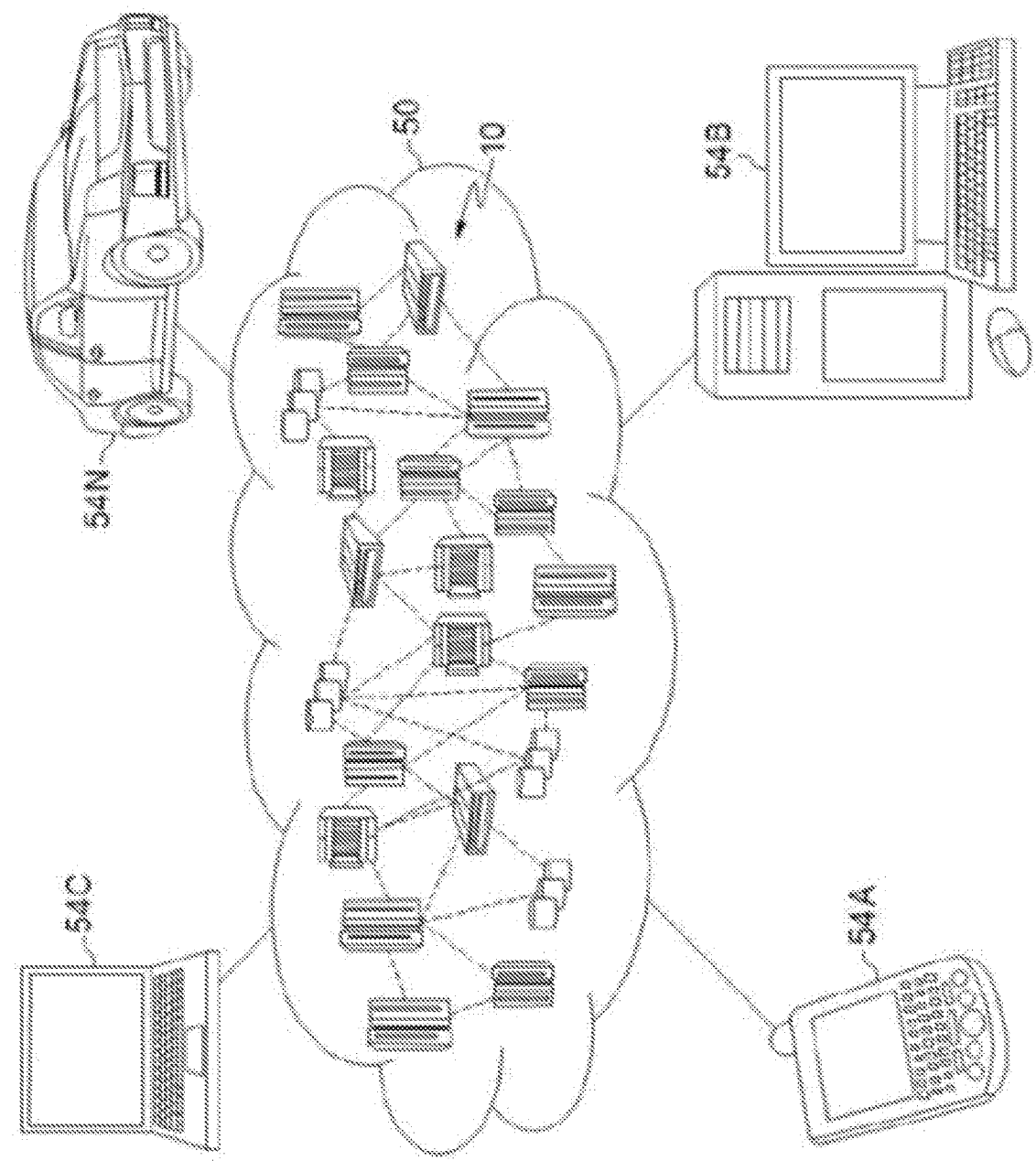
FIG. 9 depicts a cloud computing environment according to an embodiment of the present invention.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 10:
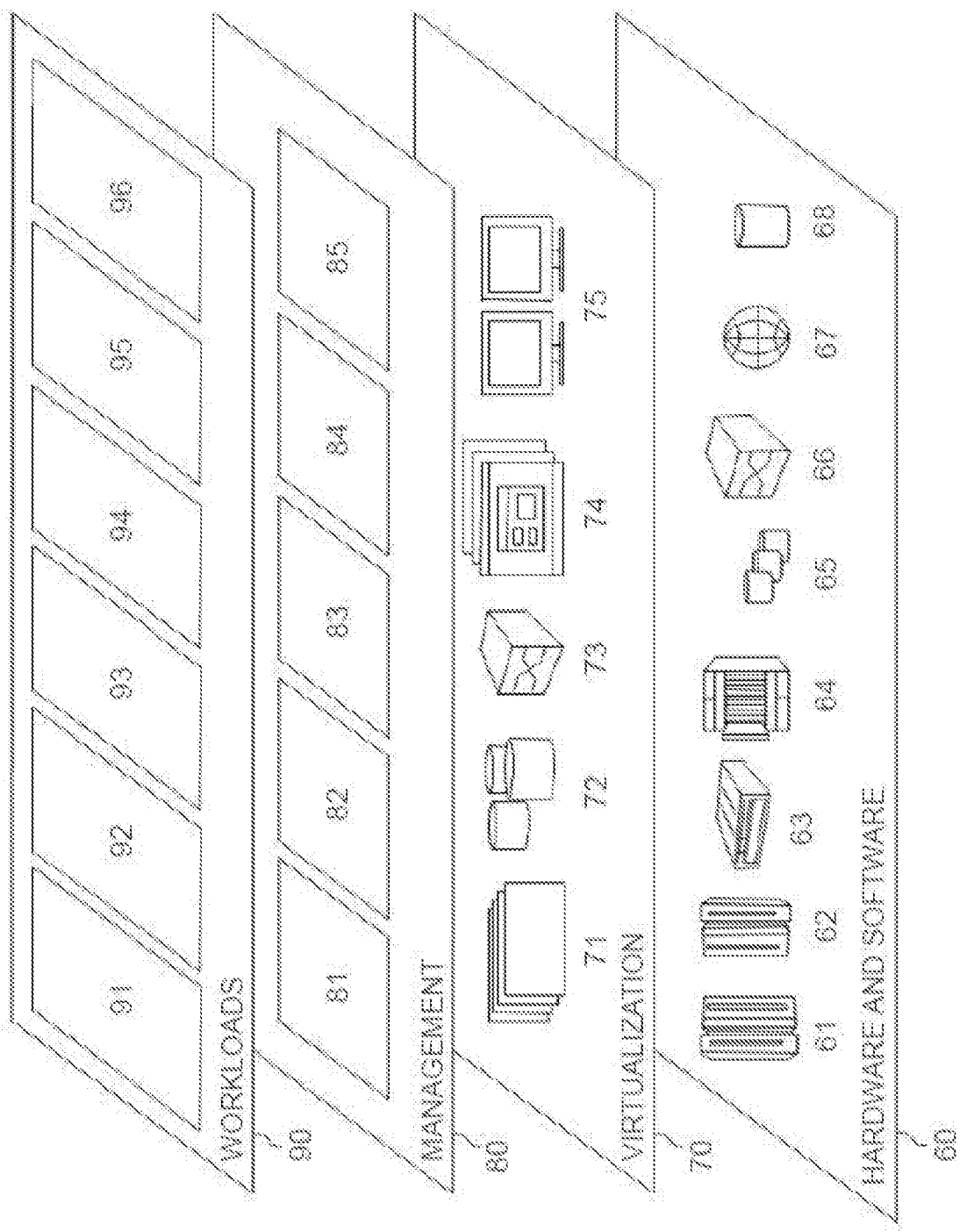
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and three-dimensional click path representation. Three-dimensional click path representation relates to analyzing a source webpage and user interactions on the source webpage to generate a three-dimensional representation of a user click path on the source webpage including through hidden content, temporarily viewable content, newly created content, and structurally similar content across multiple source webpages.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed in accordance with the present invention. However, numerous modifications and substitutions can be made without deviating from the scope of the present invention. Therefore, the present invention has been disclosed by way of example and not limitation.

The foregoing description of various embodiments of the present invention has been presented for purposes of illustration and description. It is not intended to be exhaustive nor to limit the invention to the precise form disclosed. Many modifications and variations are possible. Such modification and variations that may be apparent to a person skilled in the art of the invention are intended to be included within the scope of the invention as defined by the accompanying claims.

What is claimed is:

1. A method for generating an efficiently structured click path report that is easily viewable and understandable by a user, the method comprising:
    determining, by the computer, at least a portion of source code that corresponds to each interaction of one or more interactions;
    determining a set of interactions of the one or more interactions associated with each of a plurality of users;
    determining a click path associated with each user based on the determined set of interactions associated with each user;
    determining a similarity score between at least a first and a second source webpage exceeds a threshold value, wherein the similarity score is determined by comparing source code associated with each of the first and the second source webpage;

combining a portion of each click path associated with the first source webpage with a portion of each click path associated with the second source webpage;

merging a first portion of source code associated with the first source webpage with a second portion of source code associated with the second source webpage, wherein the first portion of source code and the second portion of source code are substantially similar; and creating a three-dimensional representation, wherein the three-dimensional representation is a report that includes the combined portion of each click path associated with the first and the second webpage and the merged source code, and wherein the three-dimensional representation significantly eliminates a click path overlap for an amount of aggregated data.

2. The method of claim 1, further comprising:

manipulating, by the computer, the three-dimensional model, wherein manipulating the three-dimensional model includes at least one of rotating the three-dimensional model, zooming into the three-dimensional model, highlighting one or more sections of the three-dimensional model, changing a scale of the three-dimensional model, and panning across the three-dimensional model.

3. The method of claim 1, wherein, identifying user webpage interaction information associated with source code of one or more source webpages and source webpage content associated with the source code of the one or more source webpages, includes injecting a script into the source code of the one or more source webpages.

4. The method of claim 1, wherein the three-dimensional model includes at least one or more of hidden source webpage content of the first and the second source webpage and data input by a user while interacting with the first and the second source webpage.

5. The method of claim 1, wherein the three-dimensional model includes at least one or more of a third portion of source code associated with the first webpage, and a fourth portion of source code associated with the second webpage, and wherein the third portion and the fourth portion of source code are not substantially similar.

6. The method of claim 1, wherein a shape of the three-dimensional model includes at least one of a cube, a sphere, a pyramid, a cylinder, a cuboid, a prism, a code and a frustum.

7. The method of claim 1, further comprising:

storing, by the computer, at least one or more of the identified user interaction event information, the identified source webpage content, the determined click path, the first three-dimensional representation, the second three-dimensional representation, and the three dimensional model.

8. A computer system for generating an efficiently structured click path report that is easily viewable and understandable by a user, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

determining, by the computer, at least a portion of source code that corresponds to each interaction of one or more interactions;

determining a set of interactions of the one or more interactions associated with each of a plurality of users;

determining a click path associated with each user based on the determined set of interactions associated with each user;

determining a similarity score between at least a first and a second source webpage exceeds a threshold value, wherein the similarity score is determined by comparing source code associated with each of the first and the second source webpage;

combining a portion of each click path associated with the first source webpage with a portion of each click path associated with the second source webpage;

merging a first portion of source code associated with the first source webpage with a second portion of source code associated with the second source webpage, wherein the first portion of source code and the second portion of source code are substantially similar; and creating a three-dimensional representation, wherein the three-dimensional representation is a report that includes the combined portion of each click path associated with the first and the second webpage and the merged source code, and wherein the three-dimensional representation significantly eliminates a click path overlap for an amount of aggregated data.

9. The computer system of claim 8, further comprising:

manipulating, by the computer, the three-dimensional model, wherein manipulating the three-dimensional model includes at least one of rotating the three-dimensional model, zooming into the three-dimensional model, highlighting one or more sections of the three-dimensional model, changing a scale of the three-dimensional model, and panning across the three-dimensional model.

10. The computer system of claim 8, wherein, identifying user webpage interaction information associated with source code of one or more source webpages and source webpage content associated with the source code of the one or more source webpages, includes injecting a script into the source code of the one or more source webpages.

11. The computer system of claim 8, wherein the three-dimensional model includes at least one or more of hidden source webpage content of the first and the second source webpage and data input by a user while interacting with the first and the second source webpage.

12. The computer system of claim 8, wherein the three-dimensional model includes at least one or more of a third portion of source code associated with the first webpage, and a fourth portion of source code associated with the second webpage, and wherein the third portion and the fourth portion of source code are not substantially similar.

13. The computer system of claim 8, wherein a shape of the three-dimensional model includes at least one of a cube, a sphere, a pyramid, a cylinder, a cuboid, a prism, a code and a frustum.

14. The computer system of claim 8, further comprising:

storing, by the computer, at least one or more of the identified user interaction event information, the identified source webpage content, the determined click path, the first three-dimensional representation, the second three-dimensional representation, and the three dimensional model.

15. A computer program product for generating an efficiently structured click path report that is easily viewable and understandable by a user the computer program product comprising:

one or more computer-readable tangible storage medium and program instructions stored on at least one of the one or more tangible storage medium, the program instructions executable by a processor capable of performing a method, the method comprising:

determining, by the computer, at least a portion of source code that corresponds to each interaction of one or more interactions;

determining a set of interactions of the one or more interactions associated with each of a plurality of users;

determining a click path associated with each user based on the determined set of interactions associated with each user;

determining a similarity score between at least a first and a second source webpage exceeds a threshold value, wherein the similarity score is determined by comparing source code associated with each of the first and the second source webpage;

combining a portion of each click path associated with the first source webpage with a portion of each click path associated with the second source webpage;

merging a first portion of source code associated with the first source webpage with a second portion of source code associated with the second source webpage, wherein the first portion of source code and the second portion of source code are substantially similar; and creating a three-dimensional representation, wherein the three-dimensional representation is a report that includes the combined portion of each click path associated with the first and the second webpage and the merged source code, and wherein the three-dimensional representation significantly eliminates a click path overlap for an amount of aggregated data.

16. The computer program product of claim 15, further comprising:

program instructions to manipulate, by the computer, the three-dimensional model, wherein manipulating the three-dimensional model includes at least one of rotating the three-dimensional model, zooming into the three-dimensional model, highlighting one or more sections of the three-dimensional model, changing a scale of the three-dimensional model, and panning across the three-dimensional model.

17. The computer program product of claim 15, wherein, identifying user webpage interaction information associated with source code of one or more source webpages and source webpage content associated with the source code of the one or more source webpages, includes injecting a script into the source code of the one or more source webpages.

18. The computer program product of claim 15, wherein the three-dimensional model includes at least one or more of hidden source webpage content of the first and the second source webpage and data input by a user while interacting with the first and the second source webpage.

19. The computer program product of claim 15, wherein the three-dimensional model includes at least one or more of a third portion of source code associated with the first webpage, and a fourth portion of source code associated with the second webpage, and wherein the third portion and the fourth portion of source code are not substantially similar.

20. The computer program product of claim 15, wherein a shape of the three-dimensional model includes at least one of a cube, a sphere, a pyramid, a cylinder, a cuboid, a prism, a code and a frustum.

* * * * *